INVENTOR
James A. McDonald
BY
Mueller, Aichele & Rauner
ATTYS.

INVENTOR
James A. McDonald
BY
Mueller, Aichele & Rauner
ATTYS.

Aug. 19, 1969 J. A. McDONALD 3,462,691

DETECTOR SYSTEM USING BLANKING

Filed Aug. 5, 1966 3 Sheets-Sheet 3

INVENTOR
James A. McDonald

BY

Mueller, Aichele & Rauner

ATTYS.

United States Patent Office 3,462,691
Patented Aug. 19, 1969

3,462,691

DETECTOR SYSTEM USING BLANKING

James A. McDonald, Melrose Park, Ill., assignor to Motorola, Inc., Franklin Park, Ill., a corporation of Illinois Filed Aug. 5, 1966, Ser. No. 570,515
Int. Cl. H04b 1/10, 1/16
U.S. Cl. 325—475 13 Claims

ABSTRACT OF THE DISCLOSURE

Receiver for deriving small signals in a first frequency band in the presence of stronger wide band signals within a second larger frequency band including a filter for selecting the first band of frequencies and a gate connecting the output of the filter to a demodulator for the signals. A detector responsive to the received signal provides a control signal in the absence of a signal in the first frequency band which exceeds a predetermined amplitude, and this control signal operates the gate to apply the small signal to the demodulator. This gates out the components of the high energy wide band signal which sweeps through the first frequency band. A memory may be provided so that the signal from the demodulator is retained during the gated out portions.

This invention relates to receiver systems which extract small narrow band signals out of a composite signal having interfering large signals especially wherein the large signals have large frequency deviations with respect to the desired signal.

Wide band signals, such as frequency modulated (FM) waves having a deviation of 150 kilocycles, at any particular instant of time occupy only a small part of the bandwidth required to transmit the signal. In the 150 kilocycle example, the FM signal is varying with frequency within the bandwidth and actually uses only a small portion of the band at any particular instant; therefore the wideband signal channel used to carry the wideband FM can additionally be used to carry another signal to form an additional communication channel. Such additional or other signal can have a small amplitude and be narrow band so as not to interfere with the wideband signal, thereby providing a separate channel hidden in the wideband signal channel.

Accordingly, it is an object of this invention to provide a receiver for extracting a small amplitude desired signal obscured by a large amplitude wideband signal.

It is another object of this invention to provide a receiver system for extracting a narrow band small amplitude signal from a wideband FM signal having a much higher energy level and greater frequency deviations.

It is a further object of this invention to provide, in a receiver system, a demodulator which includes memory means for smoothing and extracting a small signal when transmitted in the presence of a large energy wideband signal.

A small amplitude desired signal in the presence of a large interfering wideband signal is extracted for detection dependent upon the instantaneous frequency relationship between the two signals. When the interfering signal includes frequency components lying within the frequency band of the desired signal, the desired signal is blanked. At all other times the desired signal is demodulated. As such it is a time sampling receiver system.

Another feature of this invention provides a demodulator memory retaining the last instant detected desired signal amplitude wheneevr desired signal is blanked by the interfering signal entering the desired signal passband.

The demodulator output signal is provided to a low bandpass filter for additional smoothing to provide a reconstructed and smoothed replica of the modulation in the small amplitude desired signal.

Referring now to the accompanying drawings.

Figure 1:
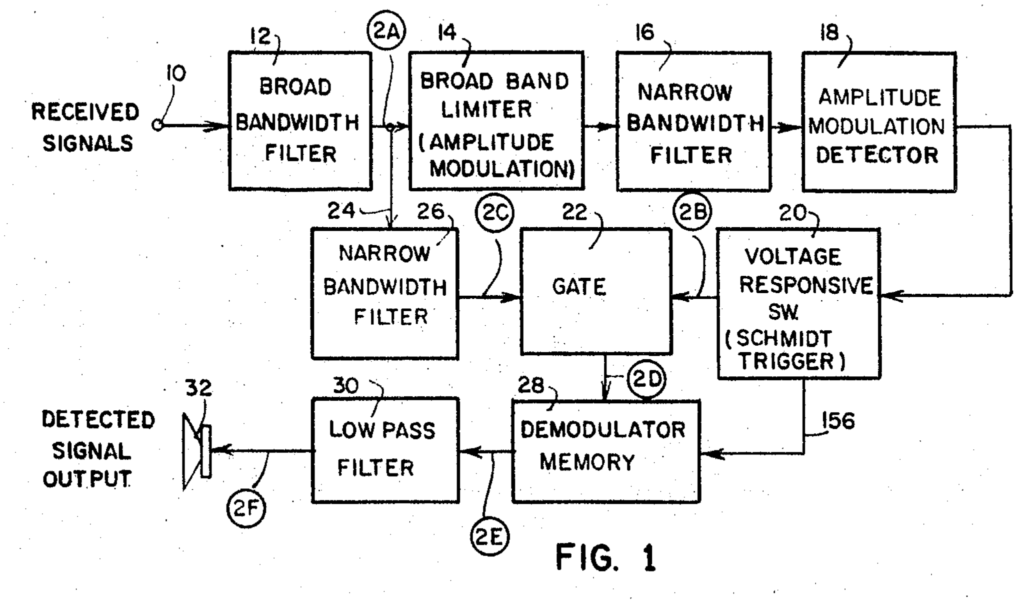
FIG. 1 is a block diagram illustrating a preferred embodiment of this invention.
Figure 2:
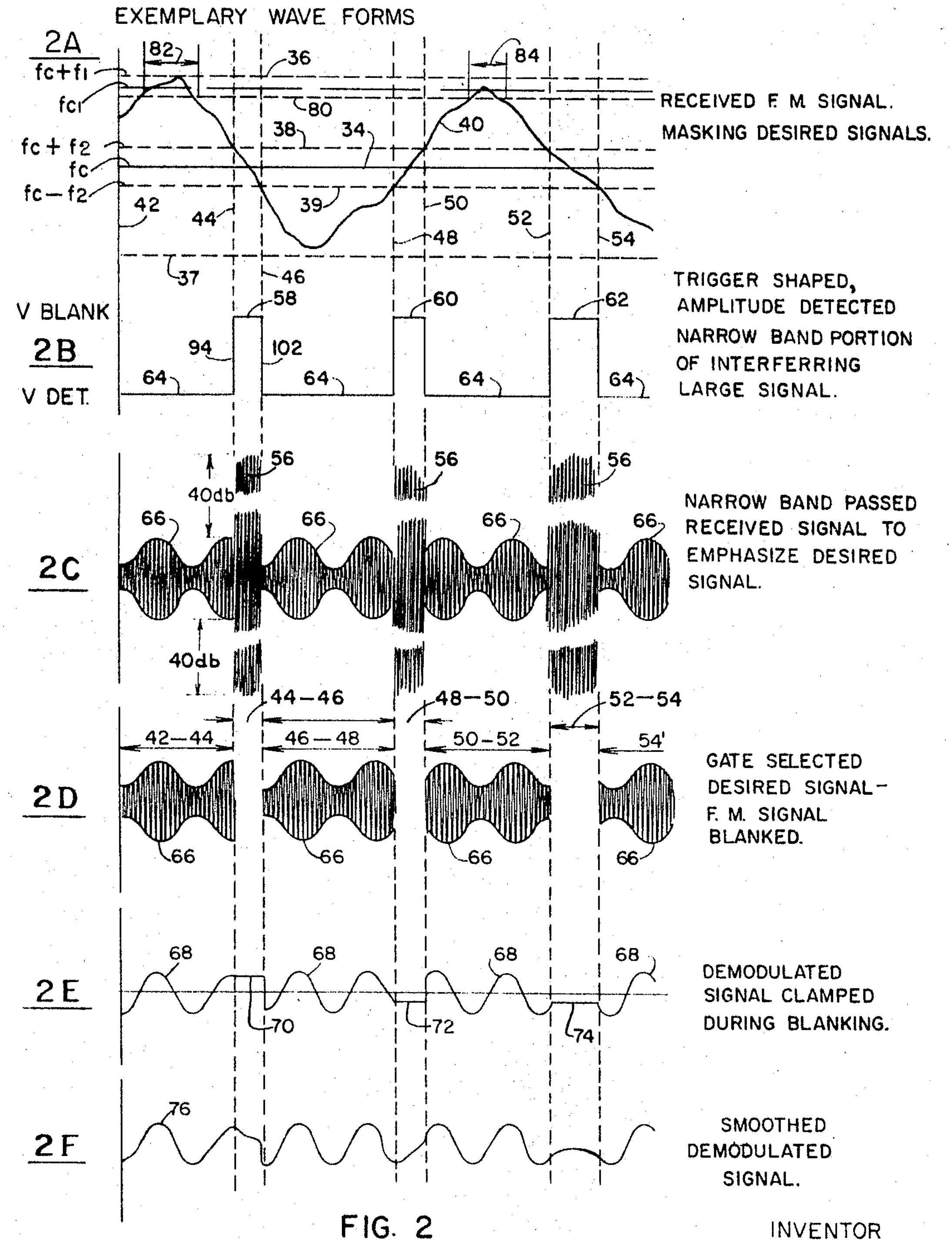
Figure 3:
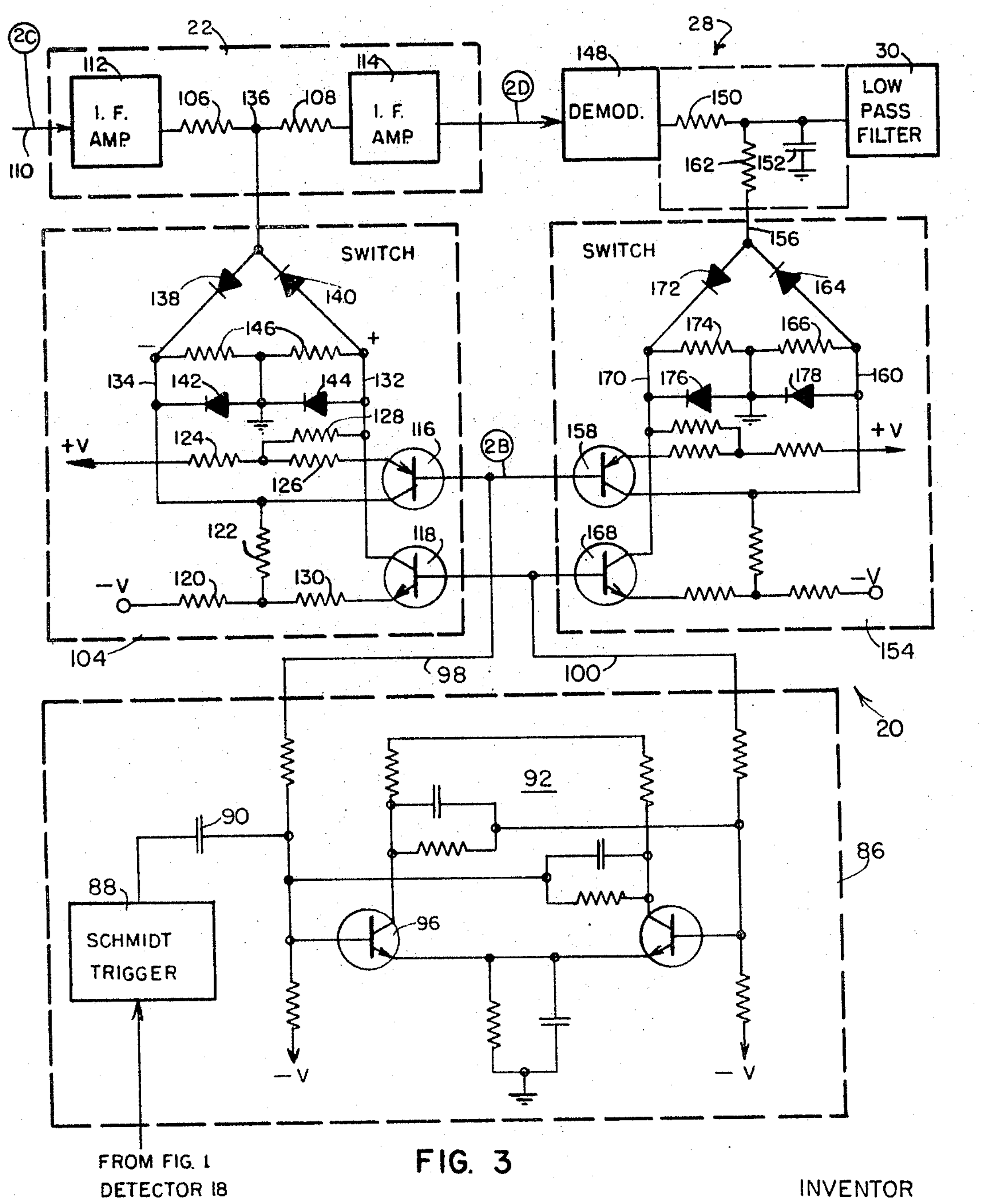

FIG. 2 includes graphs 2A to 2F illustrating waveforms found in the FIG. 1 preferred embodiment;

FIG. 3 is a schematic diagram illustrating an exemplary gating and signal detector which may be used in FIG. 1 preferred embodiment.

In practicing the invention according to a preferred embodiment the desired signal is found in a narrow frequency band having a first center frequency. The interfering wide band signal, such as an FM signal, is passed by a wide band filter tuned to the same center frequency. The output of the wide band filter then is split to follow two different paths, the first path provides blanking pulses for blanking out the wide band signal when it appears in the first frequency band, and a second path serves to emphasize the desired signal just prior to demodulation. A gate circuit passes the emphasized desired signals whenever the blanking pulses so permit. A demodulator receives the gated desired signal and demodulates it. A memory is provided in the demodulator such that whenever the blanking pulses close the gate, the memory will retain the last demodulated desired signal amplitude until the blanking pulses reopen the gate. The retained demodulation component is substituted for the actual demodulated signal during blanking.

The first path includes a limiter which serves to reduce the amplitude of the desired signal such that it is unnoticeable. The limited wide band signal are then passed through a narrow band filter tuned to the band of the desired signal, hereafter termed a first band of frequencies. The output of the narrow band filter appears as an amplitude modulated wave exhibiting a high amplitude whenever the wide band signal passes through the first frequency band and a low amplitude when it is outside said first band. The amplitude modulated wave is then amplitude detected in a usual AM detector the detected output of which controls an electronic switch which opens and closes the blanking gate.

The second path serves to emphasize the desired signal comprising a second narrow band filter tuned to the first frequency band. The output of this narrow band filter comprises two portions; one portion when the high energy signal is outside said first frequency band which consists of the small amplitude desired signal, and a second portion when the FM signal is in the band which comprises large amplitude signal completely obscuring the desired signal.

The signals from the two paths are combined in the gate with the gate passing only those low amplitude desired signals to the demodulator and completely blanking out the second path large amplitude signals.

This invention may be also practiced in an alternate mode wherein there is provided a single narrow bandwidth filter which then provides a signal which is split into two paths. One path being directed to the gate mentioned above which includes the small amplitude desired signal and the large amplitude signal. The second path leads directly to an amplitude detector and an electronic switch for providing the blanking pulses to the gate. The gate then combines the two signals providing to a demodulator bursts of gated small desired signals interspersed with blanked periods in which no signal is provided. In this latter embodiment there is no limiting action to de-emphasize the desired signal in forming the blanking pulses. Also there is no delay between the output of the narrow band filter in the first path while there is a small delay in the second path. Demodulation of the desired signal is such that this small delay is insignificant with respect to the rate of modulation of the desired signal.

Referring now to FIG. 1 the received signal to be detected appears on terminal 10. Such a received signal is illustrated in graph 2A of FIG. 2. For convenience the references 2A through 2F are indicated in FIG. 1 in circles with lead lines to circuit connections where the waveform appears.

Terminal 10 may receive signals from an IF section of the radio receiver or from other comparable devices as are well-known in the art. Signals are then fed through broad bandwidth filter 12 tuned to the center frequency of the desired frequency bandwidth. Filter 12 may be included in or formed by the IF section of a radio receiver. For example, the bandpass of filter 12 may be 150 kilocycles as is used in wideband FM IF sections. The output of filter 12 is provided over two paths; the first path generates the blanking pulses to be used in blanking out the large amplitude FM signals and a second path emphasizes the desired signal. In path one broad bandwidth limiter 14 receives the filter 12 passed signals and provides amplitude modulation of the broadband signal. The limiting action limits the amplitude of the received signal such that the amplitude of the small desired signal is so de-emphasized it is effectively removed from the broadband signal. This action eliminates any effect the desired signal may have on the formation of blanking pulses. Limiter 14 supplies the amplitude limited signal to narrow bandwidth filter 16, for example which may have a bandwidth of 10 to 20 kilocycles and is tuned to the bandwidth of the desired signal, hereafter termed the first band. Filter 16 supplies a signal which is amplitude modulated as the wide band signal swings through the first band. Amplitude detector 18 detects the amplitude envelope of the filter 16 supplied signal and supplies the detected signal to electronic switch 20. The voltage responsive switch 20 may be a Schmitt trigger, well-known in the art. Switch 20 provides an output signal indicating when amplitude modulation detector 18 is detecting a wide band signal within the first band and alternately opens and closes gate 22.

Filter 12 also provides its supplied signal over line 24 to a second narrow band filter 26 tuned to the first band. Since the input to filter 26 has not been limited by limiter 14, its output to gate 22 will be an amplitude modulated wave consisting of large amplitude signals from the FM wave as it passes through the first band interspersed with portions of the desired signal when the FM wave frequency is outside said first band. In this manner the desired signal is emphasized. Gate 22 is jointly responsive to the switch 20 output and the filter 26 to pass the desired signals from filter 26 and to blank out the filter 26 supplied large amplitude signal. The gated signals are supplied to demodulator and memory 28 which demodulates the gated desired signal. During the blanking periods the memory retains the last demodulated signal components for smoothing the received signal. Low pass filter 30 receives the demodulated and smoothed signal from demodulator and memory 28 for further smoothing and supplies such signal to an output transducer, such as speaker 32. Filter 30 may be an audio amplifier. In utilizing the above-described system it has been found that blanking out 30 percent of the desired signal still permitted a person to understand speech carried by the desired signal.

Before proceeding to the description of system operation, the theory on which it is based will be first briefly examined. The response of a narrow band filter to a wide band signal which repeatedly crosses the filter passband is an amplitude modulated wave consisting of first large amplitude signals as the wide band signal crosses the passband interspersed with low amplitude signals or no signals when the wide band signal frequencies are outside the passband. Assume the average power of the wide band signal as passed through the filter is sufficiently large to mask out all interspersed small signals. The power ratio of the desired signal to the undesired wideband signal is increased by causing the filtered large signal to gate or blank itself out, forming gated or timed sampled portions of the desired signal. If the sampling rate can be kept greater than twice the highest modulated frequency of the desired signal, the loss of information in the detection process is low. Even with relatively slow sampling rates the human ear may hear time-sample portions of a detected audio modulated signal.

It is preferred that the wide band interfering signal appear as a true frequency to the narrow band filters. A true frequency is defined as the reciprocal of the period of cos $wt$, where $t$ is time and $w$ is frequency in rad/sec. For a signal to consist of only one frequency, i.e.

$$f(t)=A \cos wt$$

$w$ is a constant, and $f(t)$ must be defined for all time. The instantaneous frequency of a wide band F.M. signal can be considered as a true frequency with respect to a given filter, if the response of the filter to the instantaneous frequency is approximately the same as the steady state response of the filter.

The narrow band filter will react to the wide band signal and the narrow band signal without generating objectional transients if the bandwidth of the filter is greater than the sqaure root of the wide band signal sweep rate. In other words:

$$f_d > B > \sqrt{2\pi f_m f_d}$$

wherein:

B=bandwidth of filter and of desired signal,
$f_d$=frequency deviation of interfering FM signal, and
$f_m$=modulating frequency of FM signal.

When the above conditions are complied with, a good reproduction of the small signal modulating component will be reproduced by the described preferred embodiment.

Referring now to graph 2A of FIG. 2, line 34 represents the center frequency of first frequency band as bounded by horizontal lines 38 and 39. The desired signal is contained in the first frequency band. A large energy received FM wave represented herein by plot 40 of the instantaneous frequency of the wave, varies in frequency through a wide frequency band indicated by lines 36 and 37. The large energy wave has all its frequency components outside the first frequency band 38–39 in time periods indicated respectively by vertical lines 42 to 44; 46 to 48; 50 to 52 and to the right of line 54. During such time periods the desired weak signal in first frequency band 38–39 may be detected without interference from the large energy wave. However, when the large energy wave has frequency components in the first band 38–39, such as during time periods between the vertical lines 44 to 46, 48 to 50 and 52 to 54, the desired signal is masked, therefore during the such latter time periods the received large energy wave will be blanked.

Suitable blanking pulses 58, 60 and 62 as applied to gate 22 by switch 20, are shown by Graph 2B of FIG. 2. Pulses 58, 60 and 62 respectively blank (close gate 22) during time periods 44 to 46, 48 to 50 and 52 to 54. Intermediate the blanking pulses, as indicated by lines 64, demodulation of the desired signal is permitted. As described with respect to FIG. 3, blanking pulses 58, 60 and 62 actuate an impedance switch to switch a low impedance circuit into a normally high impedance IF circuit for greatly detuning the IF stages. The detuning or loading is so great that it makes the IF ineffective to amplify any signals. Lines 64 represent the times when a high impedance is restored to the IF circuits. It is to be understood that other forms of gating or balnking may be applied to the practice of this invention.

In graph 2C of FIG. 2 the output of filter 26 is shown as consisting of several high amplitude bursts 56 derived from the wideband interfering signal having signal components in the first band and interspersed with small signal portions 66, which contain no portions of the interfering signal. In this manner the small desired signal is emphasized. The waveform of graph 2C of FIG. 2 can be also used to illustrate the output of filter 16, except that because of the action of limiter 14 the output of filter 16 does not include the indicated interspersed wave 66.

The signal supplied by gate 22, as shown in graph 2D of FIG. 2, is provided to demodulator 28. This signal consists of a plurality of successive signal portions 66 having intermediate blanked spaces 44–46, 48–50 and 52–54 at which times gate 22 is closed. Portions 66 are shown as an AM signal having sine wave modulation, but no limitation to amplitude modulation of the desired signal is intended.

Referring now to graph 2E of FIG. 2 there is shown a demodulated desired signal 68 in each of the time spaces 42–44, 46–48, 50–52 and 54′. During the blanking periods 44–46, 48–50 and 52–54, the output of demodulator 28 is clamped as indicated by lines 70, 72 and 74 respectively. The clamping action holds the last detected amplitude of the desired signal substantially constant until the gate 22 is again opened, whereupon the clamp is immediately removed. The clamping action serves as a memory within the demodulator. It should be noted that the clamping action occurs regardless of the polarity of the demodulated signal as indicated by lines 70 and 74.

The demodulated signal is then supplied to low pass filter 30 which results in output wave 76, shown in graph 2F of FIG. 2. The illustration herein was based upon a sine wave modulation of the small desired signal, and the closeness of output signal 76 to a true sine wave is apparent.

Figure 1A:
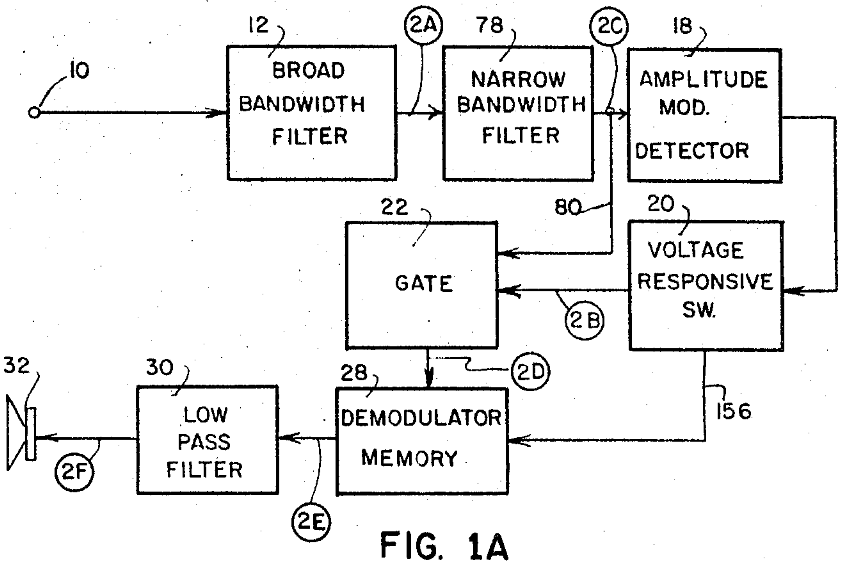
FIG. 1A illustrates in block diagram form a modification of the FIG. 1 embodiment.

Referring now to FIG. 1A like numerals indicate like parts and structural features as described for and shown in FIG. 1. In this alternative embodiment limiter 14 and filter 26 are removed from the circuits. Filter 12 supplies its signal directly to narrow band width filter 78 tuned to the first frequency band as were filters 16 and 26. Two paths of the detector system are formed at the output of filter 78. The first path consisting of amplitude modulation detector 18 and switch 20 serves to provide the blanking pulses to gate 22 as described for the preferred embodiment. The second path is merely line 80 connecting the filter 78 output wave, as shown in graph 2C of FIG. 2, directly to gate 22. The action of gate 22 is as described for the preferred embodiment in that the waveforms in graph 2B of FIG. 2 correspond to the output of switch 20, graph 2C of FIG. 2 shows the output of filter 78, graph 2D of FIG. 2 shows the output of gate 22 and the waves in graphs 2E and 2F of FIG. 2 correspond to the demodulated and smoothed time sampled desired signal.

Referring now to graph 2A of FIG. 2 there is shown an additional narrow passband of frequencies between lines 36 and 80. Such passband of frequencies are off-center from the effective center frequency of the received large energy wave. It is to be understood that the desired signal may be transmitted in this second narrow passband 36–80. For such a signal the blanking times are indicated by numerals 82 and 84, with the intervening time being available for detection of the desired signal. Since this passband is on one frequency limit of the FM band 36–37, there may be additional wideband FM signals that produce interference components appearing in passband 36–80 and not illustrated in graph 2A of FIG. 2.

Referring now more particularly to FIG. 3, the voltage responsive switch 20 is shown as including bistable circuit 86 which is responsive to the detected output of detector 18 (FIG. 1). The detected signal is applied through Schmitt trigger circuit 88 which switches conduction states in response to the detected amplitude output in a well-known manner. Each time trigger 88 switches states, a voltage change is capacitively coupled through capacitor 90 for changing the state of flip-flop 92 in accordance with the direction of change in state of Schmitt trigger 88. For example, at the onset of the blanking pulse 58 (graph 2B), as on leading edge 94, a positive-going transient wave is passed by capacitor 90 to flip-flop 92. Transistor 96 is forced to its current conducting state initiating switching flip-flop 92 in the well-known manner, such that a relatively positive voltage is provided on its output line 98 and a relatively negative output voltage is provided on the complementary output line 100. Upon the completion of blanking as indicated by the trailing edge 102 of wave 58 (graph 2B), capacitor 90 passes a negative-going transient to flip-flop 92 which makes transistor 96 non-conductive for initiating resetting or the return switching of flip-flop 92 such that a relative negative voltage is returned to output line 98 and a relatively positive output voltage is returned to line 100. Such voltages indicate the desired signal may be detected. As the pulses are provided by the Schmitt trigger 88 the flip-flop action follows the Schmitt trigger conduction states.

The blanking control impedance switch 104 of electronic switch 20 responds to voltages on lines 98 and 100 to selectively provide a low impedance path between resistors 106 and 108 in the gate 22. When switch 104 is in the high impedance state, signals are allowed to pass through gate 22 as from line 110 which receives signals from the narrow bandwith filter 26 of FIG. 1, through a first tuned IF amplifier stage 112, thence the resistors 106 and 108 and finally through second tuned IF stage 114 to be provided to demodulator 28. When switch 104 is in a low impedance state the IF stages 112 and 114 are detuned by the provided low impedance to connection 136 such that the IF stages are ineffective to amplify the signal to blank the undesired signal.

The low impedance state of switch 104 will be first described. Such low impedance state corresponds to a relatively positive voltage on line 98 and a negative voltage on line 100 indicating signals are to be blanked out. Transistors 116 and 118 are respectively connected to lines 98 and 100 and are biased such that they are not conductive when the line 98 has a positive voltage and line 100 has a negative voltage. Therefore, the collector electrode of transistor 116 is at negative with respect to ground reference potential as provided through resistors 120 and 122 from the −V source. Correspondingly, transistor 118 provides a current path from the +V source through resistors 124 and 128 to connection 132. This path provides a positive reference voltage to connection 132 and which is clamped to ground reference potential by diode 144. Resistors 146 provide a ground current path to connections 132 and 134. As the received signal is passed through resistors 106 and 108 the signal voltages at junction 136 tending to go positive are passed through diode 138 which connects junction 136 to the low impedance of the connected resistor 146. Similarly a negative-going signal voltage is passed by diode 140 to connection 132, effectively transferring the low impedance of connection 132 low impedance resistor 146 to junction 136. Therefore, the normally high impedance circuits of IF stages 112 and 114 are detuned by the low impedance of switch 104.

The operation of switch 104 being in the high impedance state will now be described. When line 98 is negative, transistor 116 is made conductive thereby transferring the +V volt as divided by resistors 120, 122, 124 and 126 to connection 134. In a similar manner, when transistor 118 is conductive, −V volts is divided through resistors 124, 128, 130 and 120 to connection 132. As the received signal is impressed on connection 136 the positive-going portions are blocked by diode 138 being reversed biased by the connection 134 positive voltage. In a similar manner, the negative-going signals on junction 136 are blocked by diode 140 being reversed biased by connection 132 negative voltage. The negative voltage on 132 reverse biases clamp diode 144, as the connection 134 positive voltage reverse biases diode 142.

The demodulator 28 memory will now be described. The demodulator 148 of usual design receives signal of graph 2D of FIG. 2 from gate 22 and demodulates it in the usual manner. Its output signal is provided to resistor 150 and capacitor 152 for being selectively passed to low pass filter 30. Resistor 150 and capacitor 152 in combination with impedance switch 154 form the memory for the demodulator 28. When the switch 154 is in a low impedance state, the signal is passed to low pass filter 30 whereas when switch 154 is in a high impedance state capacitor 152 serves to store the last demodulated signal amplitude. It may be noted that switches 154 and 104 are identical.

The connection from switch 154 of electronic switch 20 to demodulator 28 memory is indicated by line 156 in both FIGS. 1 and 3. It is to be understood that other switching systems may be used to provide the memory function in demodulator 28.

When the system is detecting the desired signal, the negative voltage on line 98 biases transistor 158 to conduction. Connection 160 is then at ground reference potential in the same manner as described for switch 104 connection 132. A negative-going signal developed on resistor 150 is passed to line 156 through small resistor 162. Diode 164 passes the signal to resistor 166. The low impedance in the circuit permits capacitor 152 to readily charge and discharge for passing the signal to filter 30. The negative signal voltage on connection 160 reverse biases clamp diode 178. In like manner transistor 168 is biased to conduction for providing ground reference potential at connection 170 in the same manner as described for transistor 118 and connection 134 in switch 104 when said switch was in a low impedance state. The positive-going signal voltage is passed through diode 172 developing the signal at connection 170 across resistor 174. It may be noted that a positive-going signal on connection 170 will reverse bias clamp diode 176.

The memory function will now be described. Switch 154 provides a relatively high impedance such that capacitor 152 is placed in high impedance circuit for preventing its discharge, thereby holding and storing the last demodulated signal amplitude to provide the memory function. A positive voltage on line 98 biases transistor 158 to current cutoff thereby placing a negative voltage from —V to connection 160 in the same manner that connection 132 received its voltage. This negative voltage reverse biases diodes 164 at all times thereby effectively disconnecting resistor 162 from ground reference potential and opening the circuit whenever a negative signal appears across resistor 150. In like manner a negative voltage on line 100 biases transistor 168 to current cutoff thereby placing a positive voltage on connection 170 for continuously reverse biasing diode 172 in the manner as described for diode 138 in switch 104. It is therefore seen that line 156 and therefore resistor 162 and capacitor 152 are essentially in a very high impedance circuit such that any current charge on capacitor 152 will be retained. Over extended periods of time the charge on capacitor 152 may leak off. However, when using relatively short blanking periods the charge on 152 and therefore the voltage input for filter 30 will remain substantially constant to provide the waveform shown in graph 2E of FIG. 2.

While the description refers to a wideband large energy FM wave masking a small desired AM signal, no limitation thereto is intended. For example, intermodulation signals may have large amplitudes and wide frequency deviations which mask a narrow band signal. This invention may be used to extract such a narrow band signal from the interfering intermodulation signals.

What is claimed is:

1. A receiver system for detecting and demodulating low energy signals in a first frequency band which is within a second larger frequency band which includes higher energy wide band signals, such system including in combination:

receiver means for receiving signals appearing in the second frequency band, first means connected to the receiver means for detecting received signals in the first frequency band having a predetermined amplitude and for supplying a control signal in the absence of signals in the first frequency band which exceed said predetermined amplitude, second means connected to the receiver means for selecting all frequency components of the received signal in the first frequency band, and gated demodulator means connected to and being jointly responsive to said first and second means to detect the signals selected by said second means only in response to said control signal for thereby deriving the low energy signals and rejecting the higher energy signals in the first frequency band, said gated demodulator means including memory means responsive to said control signal for selectively retaining the last signal derived by said demodulator means.

2. The combination of claim 1 wherein the first and second means each have a passband of frequencies which is less than the frequency deviation of the broad band signal but greater than the square root of the wide band signal expected rate of frequency deviation.

3. The combination of claim 1 further including in the first means a limiter for effectively eliminating the desired signal from the first means.

4. The combination of claim 3 wherein a narrow band filter tuned to the first frequency band is in the first means and receives signals from said limiter for passing the received high energy signals occurring in the first band of frequencies.

5. The combination of claim 4 further including an amplitude detector in the first means for detecting signals in the first frequency band, an electronic two-state switch respectively connected to the amplitude detector and being operative to supply a first indicating signal when the large energy signal has no components in the first frequency band for indicating the small signal may be detected and a second indicating signal that the received signal should be blanked.

6. The combination of claim 5 wherein the memory means of the demodulator means is a voltage clamping circuit which holds the output voltage of the demodulator substantially constant during periods of signal blanking.

7. The combination of claim 1 further including a filter means tuned to the first frequency band and electrically interposed between the receiver means and said first and second means such that the receiver means signals are passed through said filter means to both said first and second means.

8. The combination of claim 7 wherein the first means includes an amplitude modulation detector and electronic switch means responsive to the detector for supplying a first indicating signal to the gated demodulator means when the interfering signal frequencies are outside the first frequency band such that the second means signal is demodulated only when said first indicating signal is being supplied.

9. A receiver system for detecting and demodulating small signals appearing in a signal having greater frequency deviations and a higher amplitude such as to mask the small signals occurring in a first band of frequencies, including in combination:

receiver means for receiving the desired signal which appears in a first frequency band in the presence of a second high power wider band signal, filter means tuned to the first band of frequencies and connected to the receiver means for receiving its signals, a gate connected to the filter means for selectivly passing a filter supplied signal, first means connected to the filter means and including an AM detector and an electronic switch and being responsive to the filter means supplied signals for selectively opening and closing the gate, and demodulation means connected to the gate for demodulating the gate passed signals.

10. A receiver system for extracting and demodulating narrow band small signal components out of large interfering wide band signal components, including in combination:

receiver means for receiving a composite signal having wide band high energy components and low energy narrow band components to be detected and the narrow band components always occurring in a first frequency band within frequency deviations of the wide band signal components, limiter means connected to the receiver means for introducing amplitude modulation components into a received composite signal such that the desired signal is effectively eliminated, first narrow-band filter means tuned to the first frequency band and connected to said limiter means for supplying an output signal which is an amplitude modulation representation of the wide band signal frequency components in the first frequency band, two state switching means connected to said first filter means and being responsive to the supplied amplitude modulated representation signal for switching to a first indicating state when said representation signal corresponds to the wide band signal having no components in the first band, second narrow band filter means connected to the receiver means and tuned to the first frequency band for passing that portion of the composite signal occurring within the first frequency band, gate blanking means connected to said second narrow-band filter means and to said switching means and being jointly responsive thereto for passing said second filter supplied signals only when said switching means is in the first indicating state, and demodulator means connected to said gate blanking means for demodulating and indicating the signal passed thereby.

11. The combination of claim 10 further including memory means connected to said switching means and being responsive to said switching means being in its second state to selectively substantially maintain the last instant demodulated signal until said switching means again is in its first state.

12. A receiver system for detecting and demodulating a small amplitude signal received in the presence of the large amplitude signal having greater frequency deviation than the desired signal, including in combination, receiver means for receiving a composite signal having a desired signal always occurring in a first freqency band in the presence of a wider band, higher powered interfering signal, such that the interfering signal masks the desired signal, a single filter tuned to the first band and for receiving the composite signal, blanking and gating means connected to the filter and responsive to the filter output amplitudes for blocking all signals whenever a large amplitude signal is received therefrom and for passing all small amplitude signals, and demodulator means connected to the blanking and gating means for demodulating all passed signals and including means to smooth the demodulated signal.

13. A receiver system in accordance with claim 1 wherein said high energy wide band signals in the second larger frequency band have frequency modulation characteristics and wherein said first and second means each has a passband of frequencies which is less than the frequency deviation of the wide band signal.

References Cited

UNITED STATES PATENTS

| | | | |
|---|---|---|---|
| 3,112,452 | 11/1963 | Kirkpatrick | 325—477 |
| 3,126,514 | 3/1964 | Germain et al. | 325—474 |
| 3,339,144 | 8/1967 | Squires | 325—478 |

KATHLEEN H. CLAFFY, Primary Examiner

C. W. JIRAUCH, Assistant Examiner

U.S. Cl. X.R.

325—477. 478